US007391439B2

(12) United States Patent
Buchner et al.

(10) Patent No.: US 7,391,439 B2
(45) Date of Patent: Jun. 24, 2008

(54) MODULAR AUDIO-VISUAL SYSTEM TO BRING TOGETHER A LOCAL SCENE AND A REMOTE SCENE

(75) Inventors: Georges Buchner, Paris (FR); Marc Emerit, Guingamp (FR); Jean-Philippe Thomas, Trevou Treguignec (FR); Alain Leyreloup, Issy les Moulineaux (FR)

(73) Assignee: France Telecom, Paris (FR)

( * ) Notice: Subject to any disclaimer, the term of this patent is extended or adjusted under 35 U.S.C. 154(b) by 545 days.

(21) Appl. No.: 10/495,292

(22) PCT Filed: Nov. 12, 2002

(86) PCT No.: PCT/FR02/03864

§ 371 (c)(1),
(2), (4) Date: May 12, 2004

(87) PCT Pub. No.: WO03/043324

PCT Pub. Date: May 22, 2003

(65) Prior Publication Data

US 2005/0018040 A1    Jan. 27, 2005

(30) Foreign Application Priority Data

Nov. 12, 2001    (FR) ................................. 01 14572

(51) Int. Cl.
*H04N 5/232*    (2006.01)
*H04N 5/225*    (2006.01)
*H04N 7/14*    (2006.01)
*G09G 5/00*    (2006.01)

(52) U.S. Cl. ................ 348/211.12; 348/14.07; 348/218.1; 345/1.3

(58) Field of Classification Search .............. 348/14.07, 348/14.01, 14.04, 14.05, 169, 170, 207.1, 348/211.99, 211.3, 211.8, 211.12, 211.13, 348/218.1, 14.16; 345/1.3, 2.1, 2.2, 31, 33
See application file for complete search history.

(56) References Cited

U.S. PATENT DOCUMENTS

| 4,890,314 A | * | 12/1989 | Judd et al. | ............... 348/14.07 |
| 5,117,285 A | * | 5/1992 | Nelson et al. | ............. 348/14.16 |
| 5,751,337 A | * | 5/1998 | Allen et al. | ............... 348/14.07 |

(Continued)

FOREIGN PATENT DOCUMENTS

EP            765084 A2 *    3/1997

(Continued)

*Primary Examiner*—John M. Villecco
(74) *Attorney, Agent, or Firm*—Stephen Bongini; Fleit Gibbons Gutman Bongini & Bianco P.L.

(57) ABSTRACT

An audio-visual system is provided for bringing together a local scene and a remote scene. The audio-visual system includes several concatenated audio-visual modules, and feedback control and control means between the various modules. Each audio-visual module comprises an image sensing device and a sound pickup device of the local scene, and an image and sound recovery device of the remote scene in an image plane. The audio-visual modules are connected to a transmission network. The feedback control and control means ensures image and sound quality continuity on the image plane when the people being filmed or recorded pass in front of the various image and sound pickup devices of the scene concerned.

21 Claims, 10 Drawing Sheets

U.S. PATENT DOCUMENTS

| | | | |
|---|---|---|---|
| 5,760,825 A * | 6/1998 | Grenier | 348/14.07 |
| 6,160,573 A * | 12/2000 | Allen et al. | 348/14.08 |
| 6,275,251 B1 * | 8/2001 | Hartman et al. | 348/14.16 |
| 6,545,700 B1 * | 4/2003 | Monroe | 348/14.07 |
| 6,611,241 B1 * | 8/2003 | Firester et al. | 345/1.3 |
| 6,624,841 B1 * | 9/2003 | Buchner et al. | 348/14.01 |
| 6,727,864 B1 * | 4/2004 | Johnson et al. | 345/1.3 |
| 6,731,334 B1 * | 5/2004 | Maeng et al. | 348/14.08 |
| 6,943,818 B2 * | 9/2005 | Buchner et al. | 348/14.01 |
| 7,019,713 B2 * | 3/2006 | Hereld et al. | 345/1.3 |
| 7,048,386 B2 * | 5/2006 | Buchner | 348/14.07 |
| 7,190,388 B2 * | 3/2007 | Lafon et al. | 348/14.01 |
| 2002/0027608 A1 * | 3/2002 | Johnson et al. | 348/218.1 |
| 2003/0067587 A1 * | 4/2003 | Yamasaki et al. | 353/30 |
| 2007/0120971 A1 * | 5/2007 | Kennedy | 348/14.16 |

FOREIGN PATENT DOCUMENTS

| | | | |
|---|---|---|---|
| FR | 2848762 A1 * | 6/2004 | |
| WO | WO 9844734 A1 * | 10/1998 | |
| WO | WO 2004064399 A1 * | 7/2004 | |

* cited by examiner

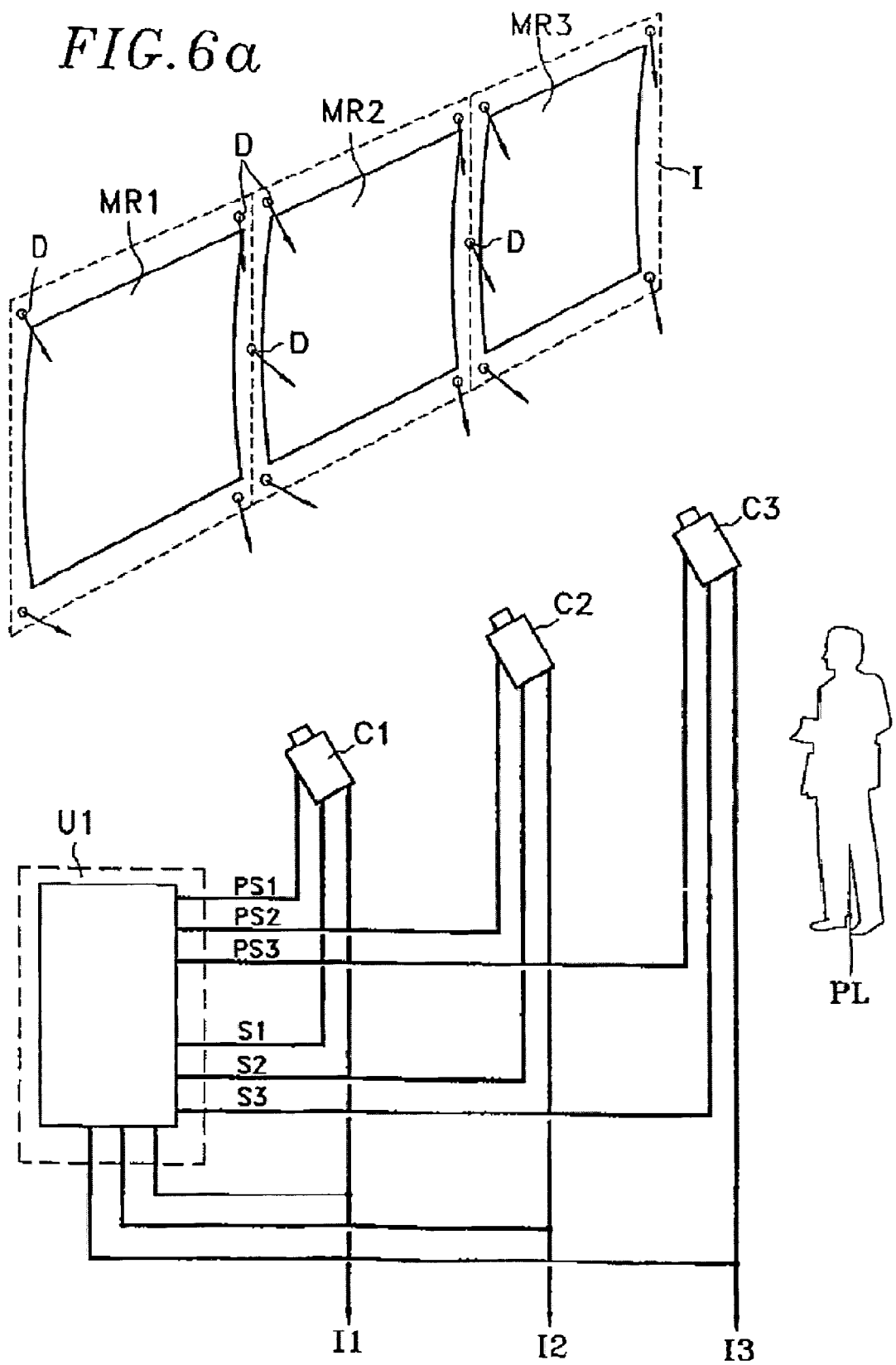

MODULAR AUDIO-VISUAL SYSTEM TO BRING TOGETHER A LOCAL SCENE AND A REMOTE SCENE

FIELD OF THE INVENTION

The invention concerns a modular audio-visual system to bring together a local scene and a remote scene that comprises several modules that includes an image sensing device and a sound pickup device for the local scene and device for restoring the image and sound of the remote scene directed at the local scene.

The field of the invention is that of telepresence that allows bringing together a local scene and a remote scene. The telepresence is the result of the audio-visual quality that creates the feeling of reciprocal presence, realism between groups of people that are intercommunicating.

BACKGROUND OF THE INVENTION

When one or several people are part of local and remote scenes, this is referred to as videoconferencing, which allows these people to meet remotely.

The telepresence is an extension of the videoconference.

As with a videoconference, the telepresence is obtained by the transmission of image, of sound, as well as data representing text, graphics, diagrams, etc.

Although a scene can take place outside, normally it takes place inside a building. This is why a local room will be designated as the place where the local scene takes place and a remote room will be designated as the place where the remote scene takes place.

The image transmission of a local room SL equipped with an image sensing device 1 to a remote room SD equipped with a recovery or restoring device follows a path that is schematically represented (FIG. 1) and that includes an image sensing device 1 such as a camera, possibly an analogue-digital converter CAN, a coding system C, a transmission network R, a decoding system D, possibly a digital-analogue converter CNA, and an image recovery device 2 such as a projector P connected to a screen, for example a plasma, LCD, CRT . . . screen.

Similarly, there can be a sound pickup system of the local room and a sound recovery system in the remote room. This system therefore includes microphones Mi and speakers Hp as illustrated in FIG. 1.

In order for the communication to be reciprocal, the sound and image systems represented in FIG. 1 are reproduced in the opposite direction to ensure that the image and sounds are captured in the remote room SD and recovered in the local room SL.

Lastly, each room is equipped with an image sensing device and a sound pickup device, as well as an image and sound recovery device.

Then, using the audio-visual system that allows bringing together a local scene and a remote scene, a system located in a room, a public area, or outside and that includes at least one module comprised of an image sensing device and a sound pickup device, as well as an image and sound recovering device connected to a communications network (internal corporate network (local network) or public network) will be designated. This is also referred to as an interactive audio-visual system.

Among the audio-visual interactive systems, there are videoconference systems. These videoconference systems are available in different formats: videoconference room, videophone, personal computer PC using multimedia communications, interactive base, etc.

Nevertheless, of interest here are also other configurations, for example, kiosks or telepresence walls in a hall, on the street; connected in a quasi-permanent manner to another kiosk or remote telepresence wall. In this case, it is no longer necessary to reserve the service, as is often the case for current videoconference systems.

A person that passes in front of a telepresence wall located, for example, in Paris, can communicate either in "sotto voce" or informally with a remote person passing in front of another telepresence wall located, for example, in LONDON, and connected to the system in Paris, as if they met on the street, in a hallway, etc. These remote persons can, for example, walk "side-by-side."

To ensure the co-presence, the following must be controlled:

Eye contact,
Person's height (scale 1),
Audio and video quality,
Screen distance,
Modularity for having a configurable image and sound wall.

Before presenting the invention, reminded below will be the usage constraints of audio-visual systems, and, in particular, all the phenomena related to environmental constraints, the effect of lack of eye contact, and the concatenation of several devices.

In general terms, telepresence audio-visual systems are made to be used at a specific distance from the scene, both in terms capture and recovery, depending on the size of the image and the service provided.

Nevertheless, viewing at a close distance is a predominant factor to ensure that the videoconference or telepresence participants are able to comfortably observe and tele-use the system, which ensures the telepresence effect. This viewing at a close distance allows, notably, increasing the sense of closeness between remote participants by favouring eye contact.

Nevertheless, the closer the scene to film is to the camera, the larger the field angle of the camera has to be. This increase of the image sensing angle at a close distance presents a problem illustrated in FIGS. 2a and 2b.

FIG. 2a schematically represents, viewed from the bottom, an image sensing device 1 located in a local room SL, filming a local scene, represented by local participants PL seated around a table located, for example, approximately 1 meter from the camera that has a wide α angle. The direction of sight of the participants is indicated by the small dash that represents the participant's nose. On a screen E, the image of the remote participants PD is formed, notably, the image of remote participant d.

When in the local room SL a local participant a that is not located in the camera's axis represented by ray b1 speaks to a remote participant, he or she looks at the image d' of said remote participant on the screen E. Although a is facing d' according to ray ad', the camera receives ray a1, and ultimately films the participant a in profile.

It is this profile image that is transmitted to the recovery device located in the remote room SD, which resends to d, as indicated in FIG. 2b, the a' image of a as if a were not looking at d. The eye contact is not recovered. This effect is called the parallax (eye contact or eye gaze) effect sometimes referred to as "lack of eye contact effect."

Recall that the image plane is the plane in which the d' image is located. In this example, it is confused with the screen but this is not always the case when the image is reflected using a mirror.

The ad' ray is a beam that comes from the local scene to be filmed located in a plane called a target plane and it is perpendicular to the image plane.

If, as indicated in FIG. 2c, the image capture were performed in cylindrical projection mode retained in a descriptive geometry, also called Monge geometry, or even industrial design, allowing the camera to capture all the rays that are parallel to ad', and not in conical projection mode according to an $\alpha$ angle as represented in FIG. 2a, the lack of eye contact effect is eliminated.

The visual parallax or lack of eye contact effect, more prosaically called the "hyprocrite" effect was presented within the framework of the videoconference but can be generalised by considering as a local scene persons standing up or no longer considering any persons, but rather objects; for example, a cube whose sides are blue or red that is placed in a tilted manner: it presents a red side and a blue side. But ray a1 only comes from a blue side. The a' image of the cube will only present the blue side instead of presenting both the red and blue sides of the cube placed in a tilted manner.

Furthermore, the size of the participants or objects during recovery varies according to the part of the field in which they are located and according to the camera's $\alpha$ angle. If several participants or objects are to be filmed, the field has to be increased, but the recovered images are somewhat curved inasmuch as the perspective effects are distorted on the edges of the image; the recovered images present a variable enlarged effect illustrated in FIGS. 3a and 3b and is well known by photographers that use wide lenses.

On each of these figures, there are two local participants PL represented, a and b, one set back with respect to the other, and filmed by the image sensing device presenting, in the case of FIG. 3a, an $\alpha$1 angle field that is smaller than that of $\alpha$2 in FIG. 3b. The recovered images a'1 and a'2 of a are almost identical in both cases, but the enlargement of b'1 with respect to b (FIG. 3a) is greater than that of b'2 with respect to b (FIG. 3b.)

A solution that allows reducing the disturbing effected caused by an image capture with a wide angle (lack of eye contact effect and distorted perspective) consists in limiting the $\beta$ angle formed at a point a of the scene with rays ad' and a1, represented in FIG. 2a. An ETSI, European Telecommunications Standards Institute, specification specifies that this angle $\beta$ should not exceed 5 degrees. This angle is obtained by limiting the filmed scene by truncating or placing the camera around the viewing axis, which disturbs viewing.

To compensate this inconvenience, there are several image sensing devices 1 available such as those represented in FIGS. 4a and 4b. To ensure the continuity of the image capture, these devices, whose optical axes are radial and within the same plane, are adjacent: several devices 1 are "concatenated". But then, the image sensing fields are common or overlap areas ZR and the recovered images on one or several adjacent recovery devices (each corresponding to an image sensing device), will present these discontinuities from the duplicated parts or overlaps. Recall that image overlap is the multiple reproduction of certain parts of the same scene captured by different cameras whose fields overlap more or less partially.

In the case of two image sensing devices 1 represented by FIG. 4a, there will an area with two overlaps ZR; in the case of three image sensing devices 1 represented in FIG. 4b, there will be areas with two overlaps when the object is close to the image sensing device, with three overlaps when it is further away, etc.

This image overlap phenomenon increases when the field angle of the image sensing devices increases.

Image processing software has been developed to solve this problem, but it still does not provide satisfactory results.

SUMMARY OF THE INVENTION

The objective of the invention is to allow adapting such system to any environment. Its objective is, in particular, to allow installation without the limitations related to available space.

To do so, the invention proposes a modular system comprised of independent modules. These modules can be assembled from a number defined by the space available to the installer. Next, the concatenation or concatenated modules will be described to indicate that these modules form a continuous chain both physically and operationally. These modules are, according to the invention, operationally dependent without presenting the problems that arise from the lack of image and sound continuity for an observer of the remote scene when users pass in front of the different modules of the local scene.

This invention then proposes a modular interactive system that is perfectly adaptable to the environment in which it is to be installed and that, in spite of the modularity, does not present the inconveniences mentioned in the previous art.

Therefore, the purpose of the invention is to obtain an audio-visual system to bring together a local scene and a remote scene, mainly characterised in that it includes:

several concatenated audio-visual modules, each module containing an image sensing device and a sound pickup device of the local scene, and an image and sound recovery device of the remote scene in an image plane I, and the modules are connected to a transmission network, feedback control and control means between the various modules to ensure image and sound quality continuity on the image plane when the people being filmed or recorded pass in front of the various image and sound pickup devices of the scene concerned.

The modules include presence detectors of an adjacent module that are connected to feedback control and control means.

The detection means of an adjacent module can be comprised of presence sensors.

The detection means of an adjacent module can be comprised of sound reception means and the detection of a modification of this reception.

The feedback control and control means include feedback control means of the image sensor devices that receive the reference signals to feedback control the devices with respect to these reference signals.

The feedback control and control means include feedback control means of the image recovery devices that receive the reference signals to feedback control the devices with respect to these reference signals.

The reference signals can be provided by an outside device or by one of the modules.

The reference signals are provided for each module by the adjacent module(s).

If the reference is external, this reference can be obtained by the sound pickup device.

The feedback control and control means include controlling means for the sound pickup devices and the sound recovery devices of the reference signals to control the devices with respect to these reference signals.

The feedback controlling means are created using processing units that include a programmed program memory for implementing the required feedback control means.

The feedback control and control means can control a transmission on the network over a data flow (IP or any other protocol) separated for each module.

The feedback control and control means can control a multiplexed transmission over a single network channel for all the modules.

BRIEF DESCRIPTION OF THE DRAWINGS

Other features and advantages of the invention will be evident upon reading the description created as a non-limiting example and viewing the attached diagrams on which:

FIG. 6a represents in greater detail the feedback control diagram of the module cameras.

DETAILED DESCRIPTION OF PREFERRED EMBODIMENTS

Figure 1:
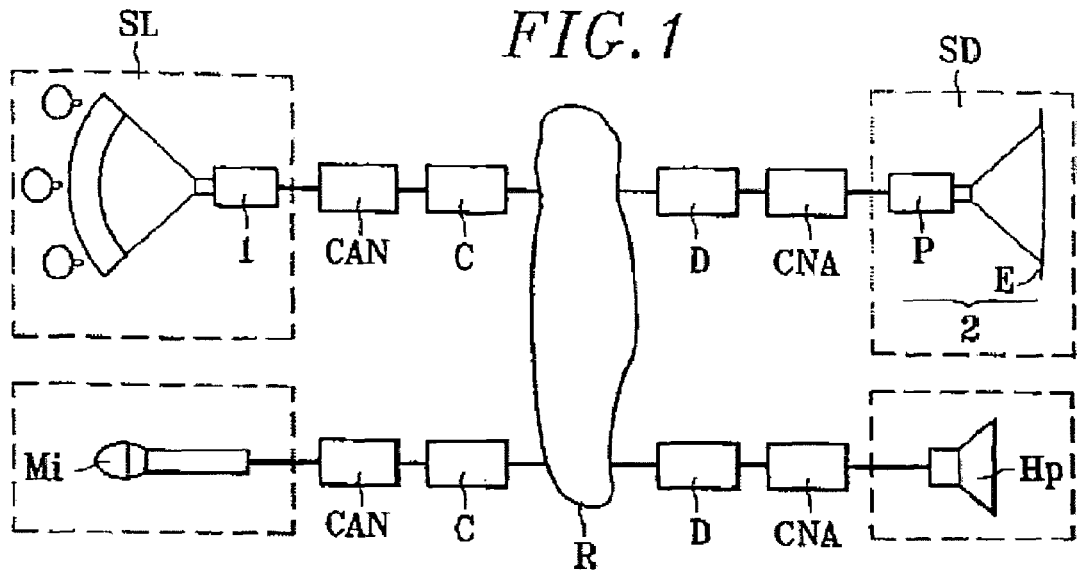
FIG. 1 schematically represents the chain of elements located along the entire path of an image and the sound between a local room and a remote room, FIGS. 2a, 2b, and 2c already illustrate the effect of lack of eye contact.
Figure 2A:
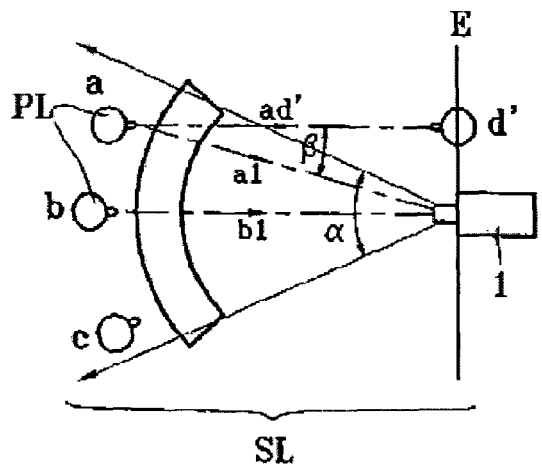
Figure 2B:
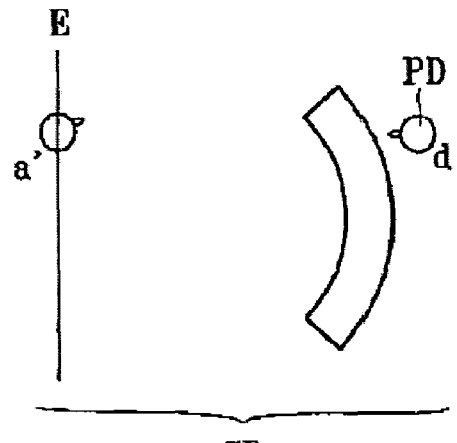
Figure 2C:
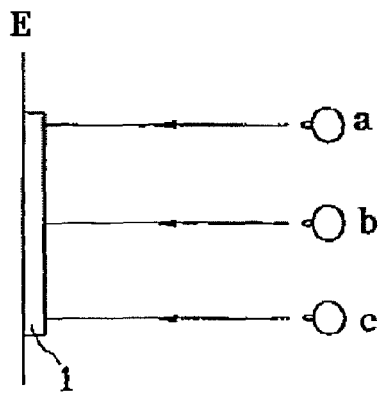
Figure 3A:
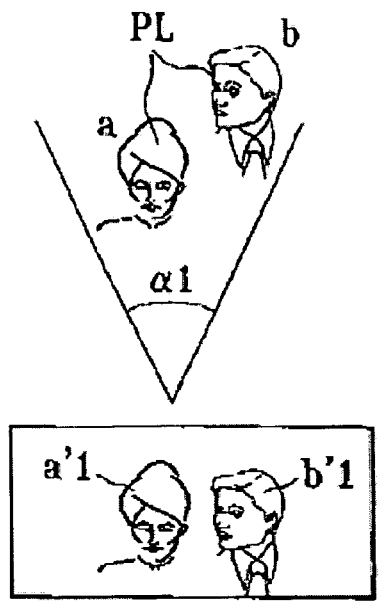
FIGS. 3a and 3b illustrate the effect of enlarging the image recovered according to the field angle of the image sensing device.
Figure 3B:
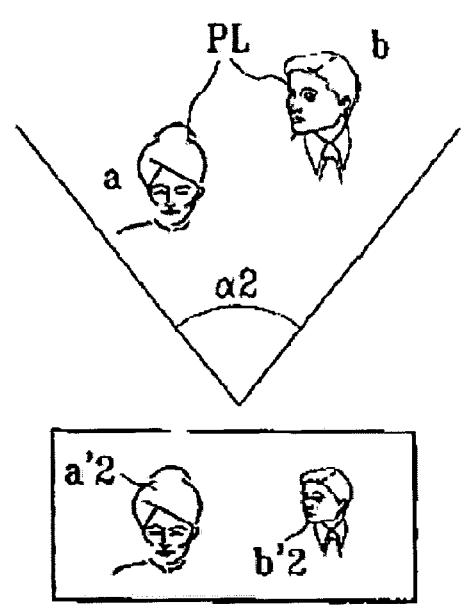
Figure 4A:
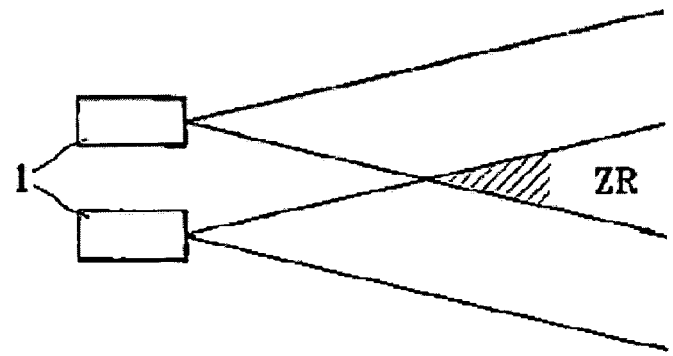
FIGS. 4a and 4b illustrate the overlap areas in the case of two and three image sensing devices, respectively.
Figure 4B:
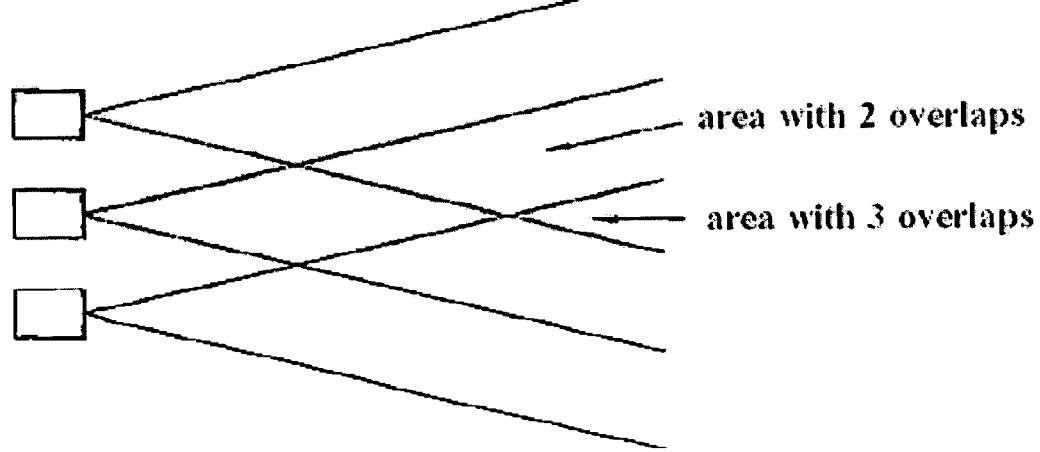

An audio-visual module M1 includes an image sensing device and a sound pickup device of the local scene. It also includes an image recovery device and a sound recovery device of the remote scene in an image plane I.

In a practical manner, the image sensing device includes a camera C1 and the sound pickup device includes one or several microphones Mi.

The image recovery device includes an image projector P1 and a screen E, that is, a video projector or any other type of viewing device, for example, a plasma system. The sound recovery device includes one or several speakers Hp.

The image sensing device allows filming the local scene to transmit the latter through the communications network to which the equipment is connected and to recover it using remote equipment connected to the local equipment.

According to another embodiment, it can be foreseen that the image captured by the camera be a folded image. This configuration will be chosen when the user wants to decrease the distance between the scene to be recorded and the image sensing devices. In a practical manner, juxtaposed mirrors are placed in front of the cameras.

If the room allows it, and whatever the particular embodiment of the modules, several independent modules can be connected, and these can be made operationally dependent whilst ensuring image and sound continuity.

This invention allows, in particular, preventing image overlaps or sound gaps during recovery. Recall that sound gaps correspond, for example, to a variation of voice pitch or a variation in the sound level, or even to areas not designed for sound pickup.

In addition, it allows ensuring a continuity of the image and sound quality when a person moves in front of the kiosk or the screen or the image wall.

To this end, according to the invention, there can be feedback control and control means of the various equipment pieces of the system. The principle diagrams are illustrated in FIGS. 5a and 5b.

Three modules have been concatenated as an example. Each module is represented by a block divided into two operational blocks, one corresponding to video 2 and the other to audio 1. Presence detectors D of an adjacent module allow resending a presence signal to the feedback control and control device P. The presence detectors D can be implemented using any type of detector known to those skilled in the art, for example, photoelectric cells, ultrasound detectors, household presence detectors, etc.

The entire system works as if each module interacted with its neighbours and modifies their visual and audio characteristics (as well as the transmission equipment and the network multiplexing.) For example, each module will transmit a data flow that is separated from the others or the n flows of the n modules will be multiplexed on a single channel; the control device will allow the modules to reserve this same channel (ADSL, VLAN, IP, Virtual Channel, ATM.) Of course, the modules are connected to a transmission network that is not represented here. The data flow could be, for example, based on an IP protocol or any other native ATM protocol, streaming standards of computer developers.

Figure 5A:
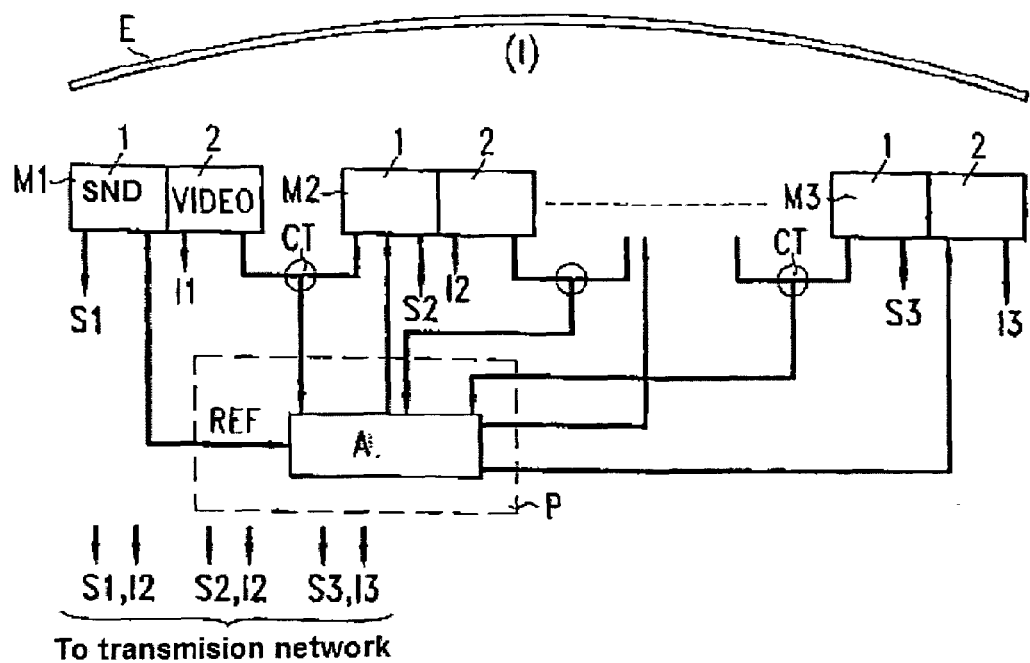
FIGS. 5a and 5b represent the diagrams of the principle of the invention according to a first and second embodiment—only three concatenated devices are represented.
Figure 5B:
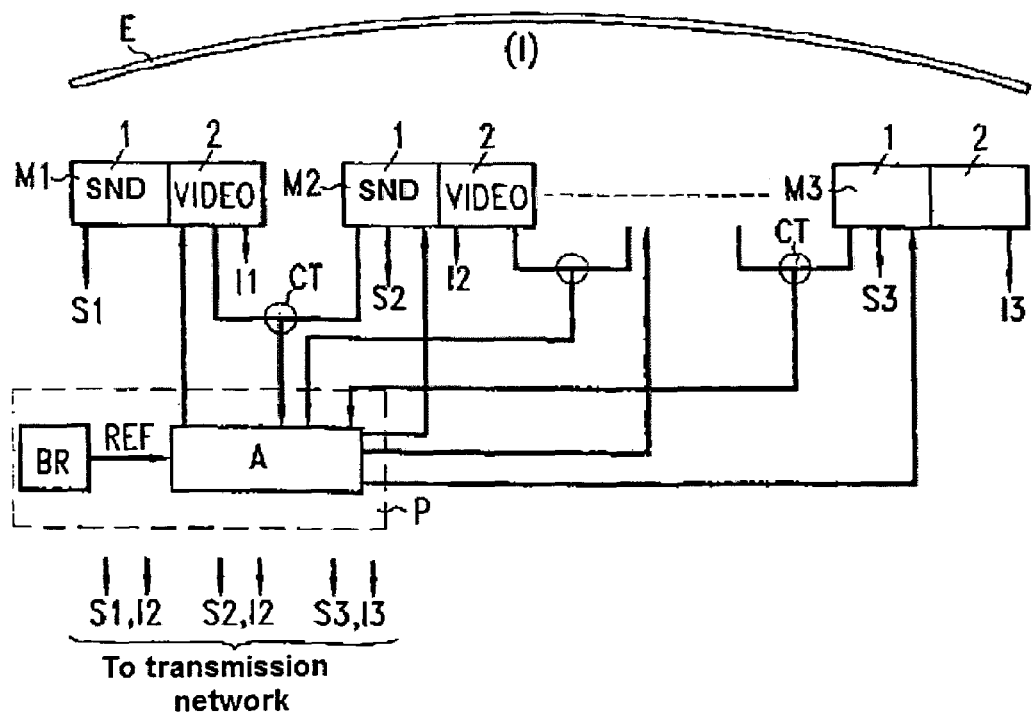

One of these modules, the master module, can be used as reference for the feedback control the other modules, as represented in FIG. 5a. The feedback control operational block A can be implemented using a processing unit integrated into the master module or into an external control as represented in FIG. 5a.

Also foreseen, the feedback control reference can be external to the system, as represented in FIG. 5b.

Also foreseen, each module can also be converted into, for example, a reference on a turn by turn basis.

To simplify the description, below is described a system that only includes three modules on each site and feedback controls that take one of the modules as a reference. As indicated above, the references can be provided by an external device in which the default values will be programmed for the various parameters to be feedback controlled according to the number of concatenated modules.

FIG. 6A illustrates the feedback control of image captures. The three cameras of the three modules are feedback controlled in their positioning to prevent overlaps. The two cameras are also feedback controlled in terms of their image analysis, notably, on the colorimetric signals and luminance in order to equalise the colour and black and white levels.

A first feedback control device therefore allows feedback control the positioning of one of the cameras with respect to the positioning of the other, in order to eliminate any overlaps of the areas filmed. For example, transmission diodes D could be used or test patterns could be placed on the image wall I to provide references for the individual framing of the cameras and then correcting the cameras C2 and C3 according to the framing of C1.

Figure 10:
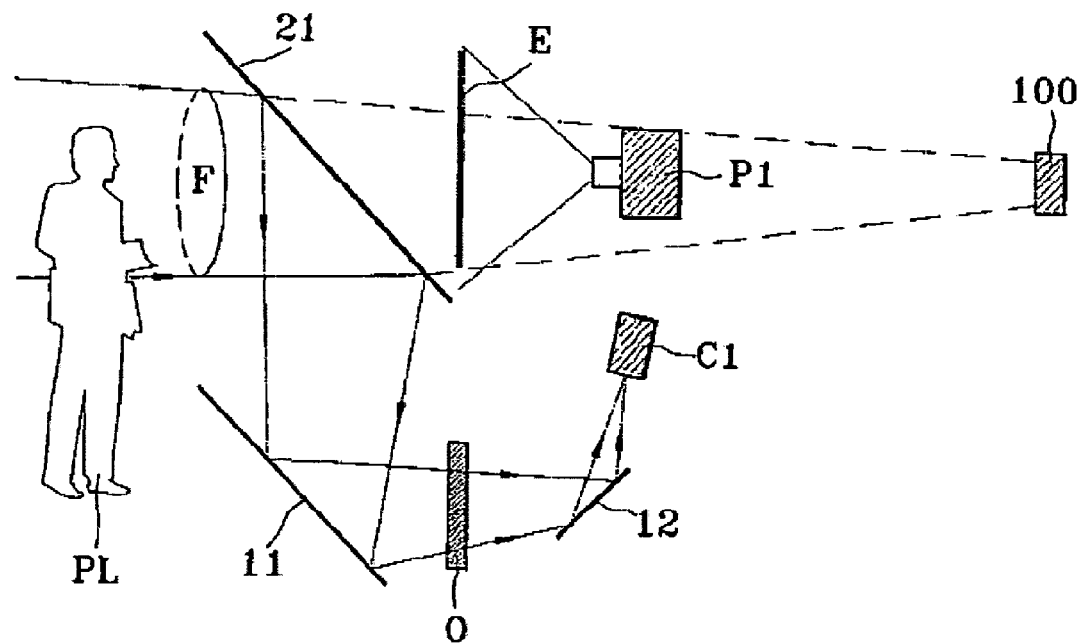
FIG. 10 represents a detailed exampled of an image sensing device and a recovery device of a module.

In this implementation example, the image to be filmed will be resent to the cameras using a folding mirror as in the example provided after the description regarding FIG. 10.

The feedback control device U1 receives a position signal PS1 resulting from the framing obtained after the detection of the signals transmitted by the diodes D. The U1 device receives the signal transmitted by the positioning command of the first camera C1 and outputs the positioning command signal PS2 and PS3 of the second camera C2 and the third camera C3.

Furthermore, a feedback control device acts on these colorimetric and luminance signals of the second and third cameras in order to set them or feedback control them to the signals of the first camera. The calorimetric signal parameters are obtained by signal S1 and allow generating the command signals S2 and S3 of the other two cameras as indicated in FIG. 6a.

Figure 6B:
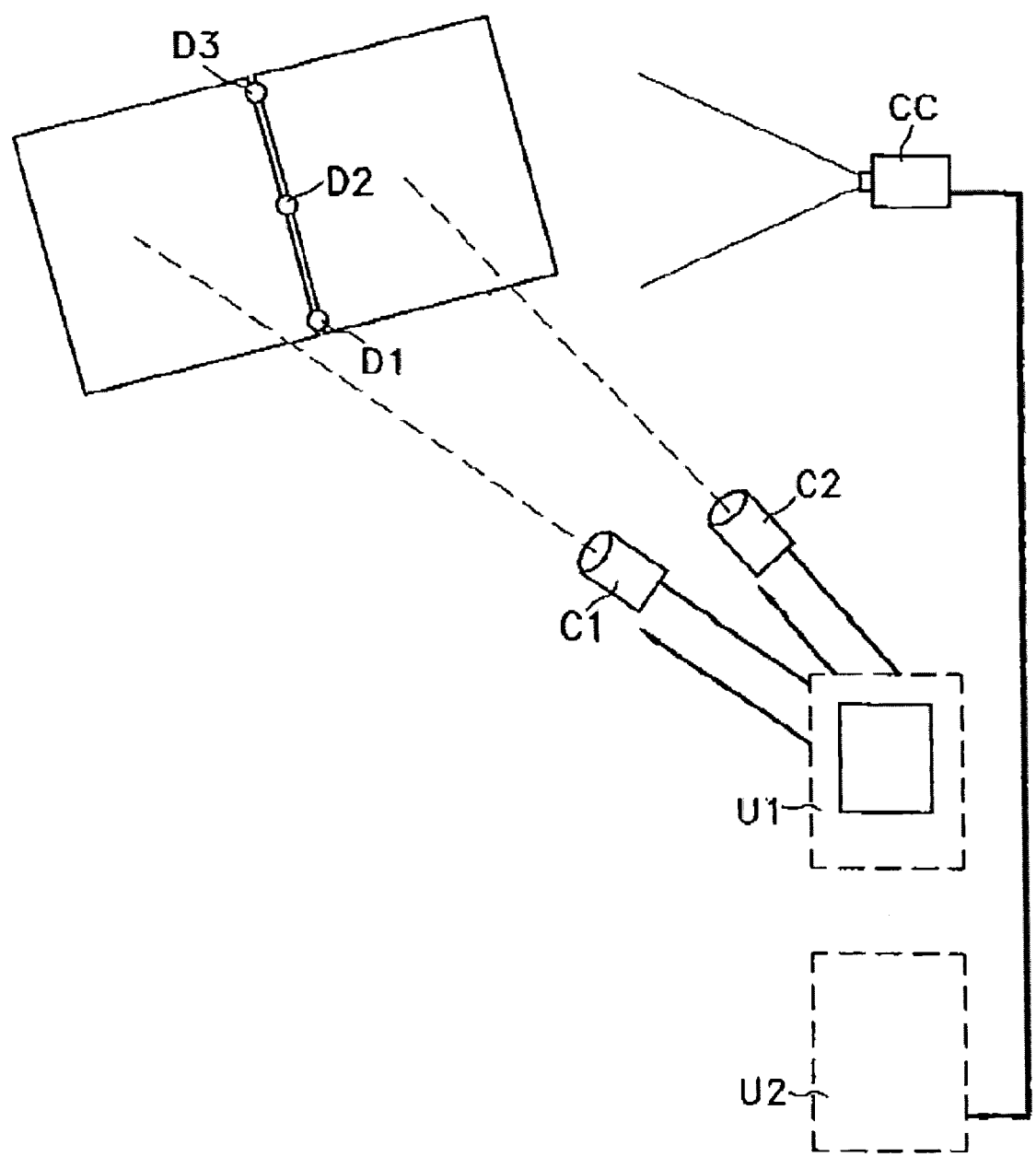
FIG. 6b illustrates a feedback control example to ensure image continuity.

FIG. 6b illustrates a feedback control example to ensure the continuity of the image through the automatic calibration of the field of the cameras.

When a module is eclipsed over another, the image wall must be uniform, that is, it must have a continuity of images. The automatic operation can be performed by manual or automatic calibration. To do this, there are reference points available, for example, a paper test pattern (that can be an object in the decor, or a bright spot.) The direction of the optical axis of the adjacent cameras (only two are represented here) are therefore feedback controlled to ensure image continuity or the remote control zoom can be used or even the x, y, and z positions of the cameras can be established.

In the example, the three light diodes D1-D3 placed in the decor are used as reference points for the cameras. The feedback control program loaded in the computer analyzes the two images received and locates the position of the diodes on these two images. The program is designed to consequently act on the command parameters of the cameras or folding mirrors of the beam so that they are blended.

A control camera CC represented on this diagram can be used to analyse the recovered images. This camera will be used, for example, to lock the video projectors by analysing the images that are juxtaposed. It can also be used to verify whether the adjacent images have the same colorimetry.

To ensure the video quality, for example, a same object (linear or logarithmic grey colour reference) can be placed in front of each camera and the graphics card interfaces that control the video projectors can be activated to equalise the contrast, signal gamma, brightness, etc. in the same way as for the colorimetry.

The processing unit is created using a computer as indicated in the figure. The image capture, processing, and recovery are controlled by the computer programmed for this purpose and with all the desired feedback control elements. The processing can be easily be performed by those skilled in the art using an electronic control unit, for example, by programming a PC graphics card using APIs (programme interface) provided by the manufacturer.

The three projectors P1, P2, and P3 are also feedback controlled individually or with respect to an external reference.

Figure 7:
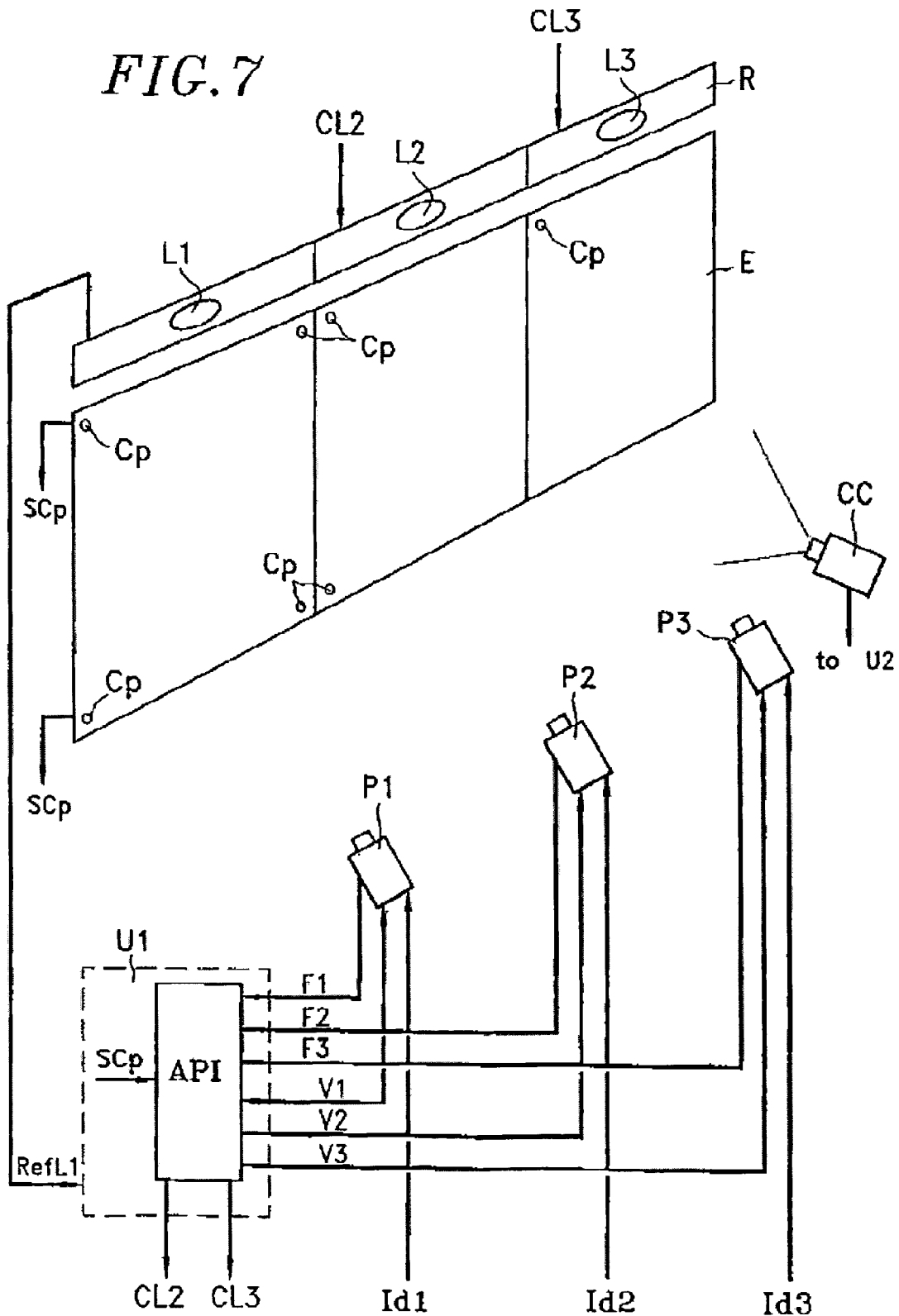
FIG. 7 represents in greater detail the feedback control diagram of the module projectors.

In the example described and illustrated in FIG. 7, one of the three projectors will provide the reference video signals (V1), in particular, the colorimetry and luminance signals, to the feedback control device (U1) so that the device may adjust the video signals V2, and V3 of the other projectors to the given reference values. A control camera can be used to verify whether the adjacent images have the same colorimetry.

Furthermore, the feedback control device U2 includes feedback control of the focal command F2, F3 of the video projectors using the command signal F1 received from the reference video projector. It can also have a size or parameter that is completely different from the focus, for example, the keystone deformation or luminance, colorimetry or gamma signal. The reference video projector automatically adjusts its focus using the capture of the signal SCp transmitted by the light sensors Cp distributed around the screen E.

Also, the lighting R of each module can be controlled by feedback control in order to ensure a homogeneity of said lighting along the entire image wall. To do this, the lighting device (L1) of one of the modules can also be used to provide a reference point to a feedback control system so that this system can control the other lighting devices L2, L3 according to the reference formed of the devices that measure, for example, luminance (lux-measured, that is, candela by square meter) colour temperature (colorimetry,) or any other "psycho-visual" quantity.

Figure 8:
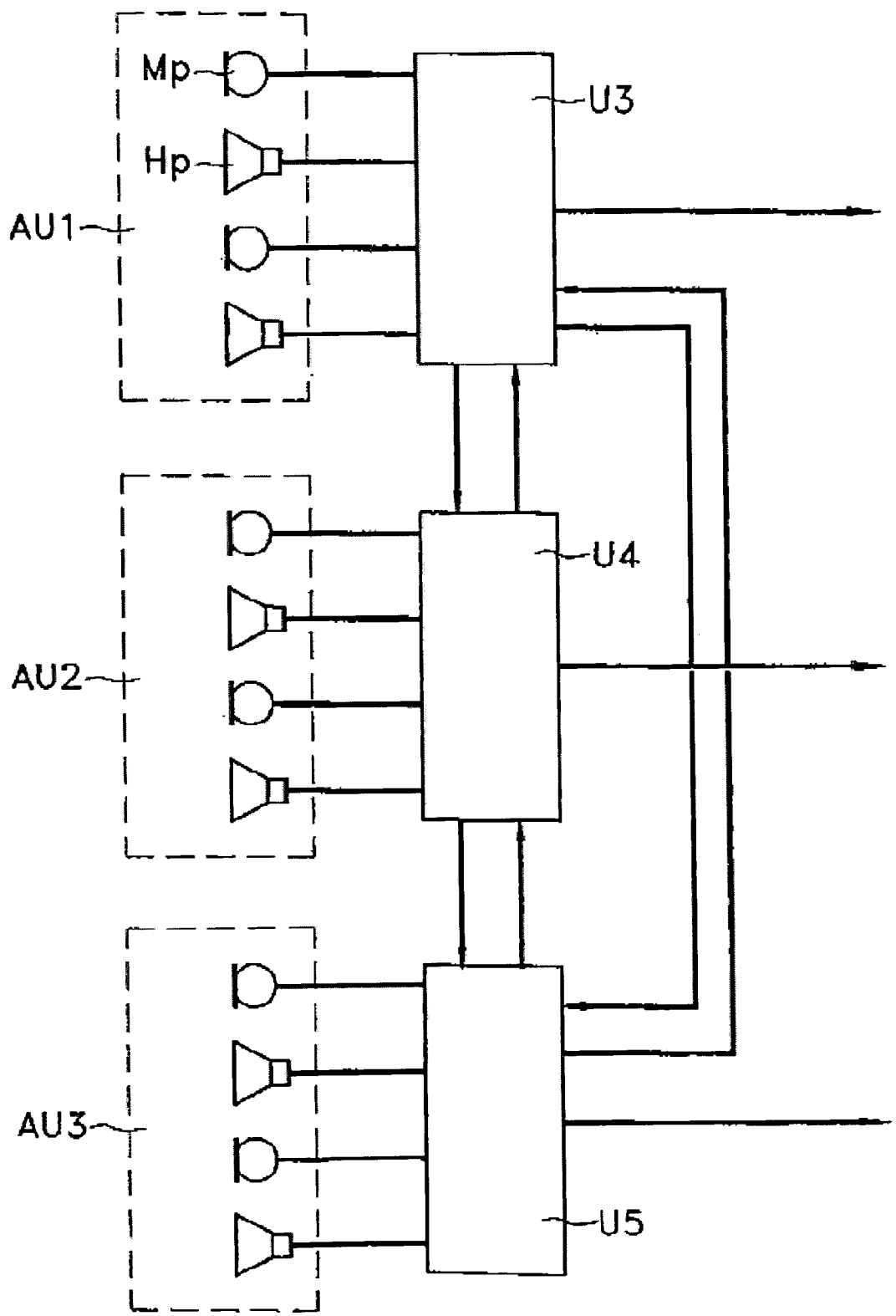
FIG. 8 illustrates the feedback control of the image and sound pickup devices and the recovery devices.

Please refer now to FIG. 8.

In the same way, the sound pickup and recovery devices AU1, AU2, and AU3 of each module are feedback controlled with respect to the reference signals that are supplied as per the example given by the sound pickup and recovery devices of a module.

The video data can also be used to control and feedback control sound. Indeed, the sound parameters can be modified when the image is modified; an image is modified by the arrival of a person for example.

Feedback control can be performed, for example on the echo control, network management for sound, sound pickup system control, sound recovery control system or any other element necessary to establish a sound communication between the two rooms.

A module can include several sound pickup devices and a corresponding number of sound recovery devices in order to have, for example, a spatialisation of the sound that matches the image. The signals acquired by all the microphones Mi of each modules are processed using a processing unit, U3, U4, and U5, respectively, for each of the modules, programmed to ensure, for example, echo cancellation to increase microphone loop stability—speaker connected bilaterally and reducing the pickup rate (Larsen effect or echo). Consequently, foreseen is performing a processing procedure on each module to prevent Larsen effects and feedback control the modules using the same processing units U3, U4, and U5 with respect to a reference. This reference can be provided by one of the modules so that the entire system forms a "global" or complete sound pickup system of the area to be covered.

Of course, foreseen is a sound pickup device to ensure coverage of the image sensing area and that can go beyond for the end modules of the scene.

The feedback control devices will preferably be created by processing units such as microprocessors, microcontrollers, an automatic operator, or a computer central unit. For this purpose, the processing units include programmed programme memory for implementing the required feedback control means. These devices can be integrated into the master module or the external modules as represented in FIGS. 5a and 5b.

A module can also feedback control the other modules by receiving the concatenation data for the sound or image pickup elements.

Figure 5C:
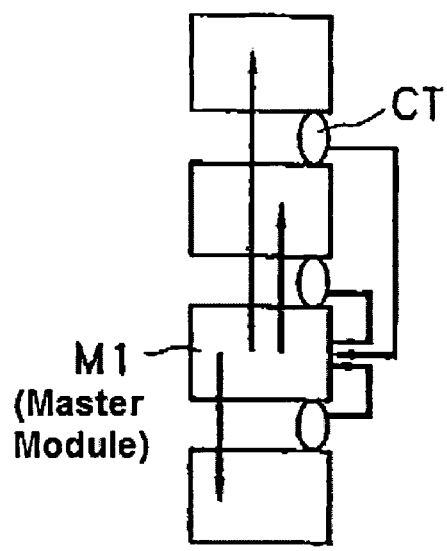
FIGS. 5c and 5d illustrate examples of feedback control according to embodiments of the invention.
Figure 5D:
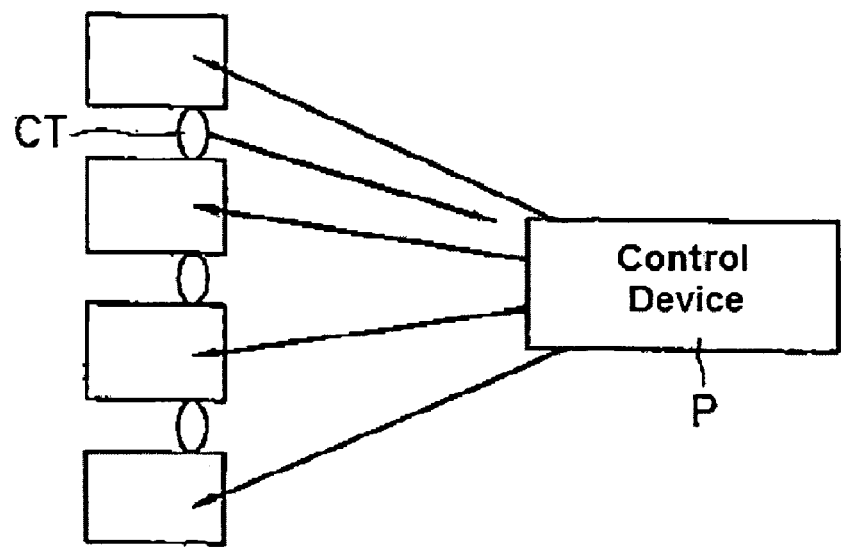

For example, there can be connectors CT on each module that detect that one or two modules are connected to it; the detection signal is sent to the master module that controls the coordination and the transmission of the commands to the various modules. Or, it can be the external reference device that ensures the coordination and transmission of commands to the various modules upon receipt of the connector signals. These two examples are illustrated in FIGS. 5c and 5d.

The presence of an adjacent module is detected and communicated to the control device P that will allow controlling the various modules by modifying the audio-visual characteristics of each module.

Concatenation can be performed using mechanical or electrical eclipsing.

There can also be a way of controlling the sound with the video. For example, the field of vision of a camera of a module can be controlled according to the sound pickup lobe of the devices of this module and vice versa.

The sound pickup devices can allow detecting the concatenation of several modules. Indeed, if, for example, the reception of sound presents a modification that is not due only to the passage of a person in front of the devices but also detected by the response filters in the sound pickup chain, a concatenation is detected, and the feedback control means of the various modules are activated.

Next, a few examples of practical embodiments of devices are provided in the composition of a module.

Figure 9A:
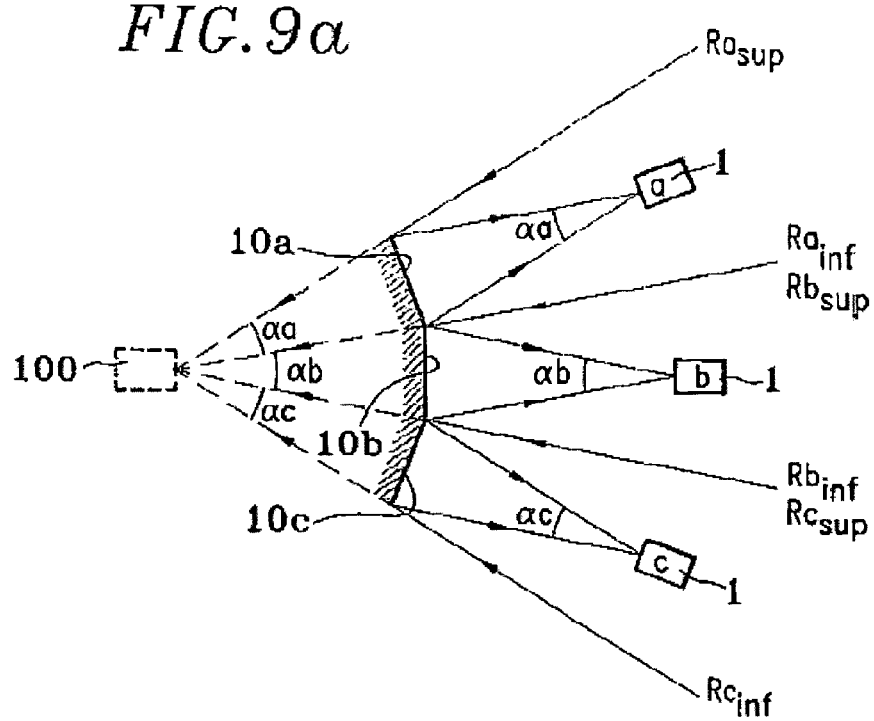
FIGS. 9a and 9b illustrate two examples of the implementation of image sensing devices relative to the concatenated modules.
Figure 9B:
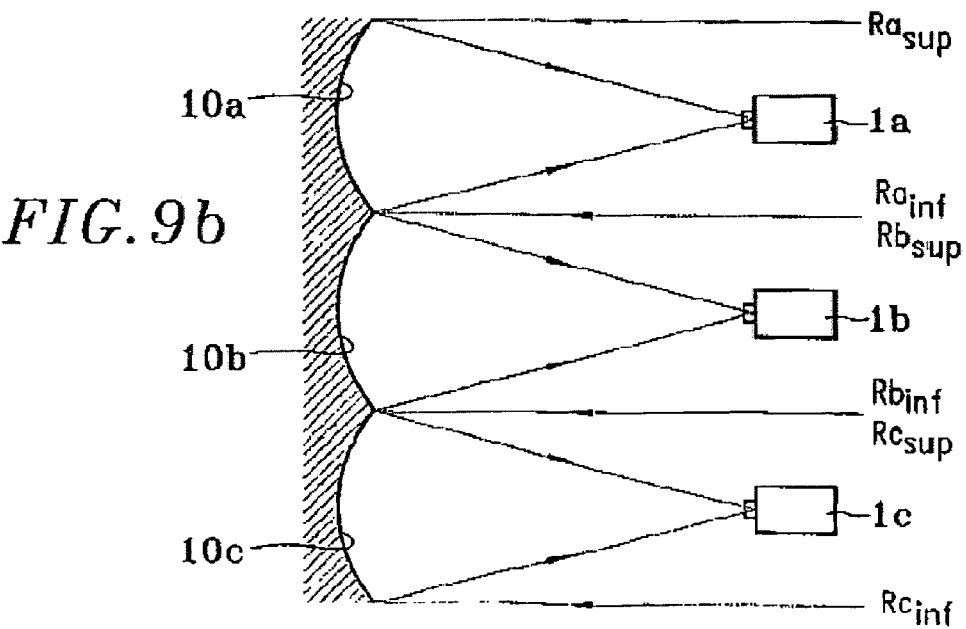

FIGS. 9a and 9b illustrate two examples of concatenated image sensing device implementation. The adjacent mirrors 10a, 10b, and 10c are placed, respectively, on the beam path Fa, Fb, and Fc. The angle fields αa, αb, and αc are preferably equal.

In the case of FIG. 9a, the mirrors are placed in a kiosk, that is, according to a polygon or curved portion. The more open the field of the angle, the longer are the sides of the polygon and the further away from each other are the image sensing devices 1a, 1b, and 1c. In this type of configuration, everything occurs as if the image sensing devices 1a, 1b, and 1c were superimposed at location 100.

The mirror can be flat.

In the case of FIG. 9b, the image sensing system is telecentric: mirrors 10a, 10b, and 10c are concave and each contain a focus, so that when transmission occurs on devices 1a, 1b, and 1c, respectively located in the mirror focus, beams Fa, Fb, and Fc comprised of inter-parallel rays, the beams are therefore cylindrical in shape. The image capture is no longer conical but rather cylindrical for a single image sensing device. This type of telecentric system thus presents the advantage of reducing or eliminating the "lack of eye contact" effect and image overlaps.

Described next in greater detail is an example of a specific embodiment as illustrated in FIG. 10 of the image sensing device and recovery device of a module.

The recovery module includes a video projector P1 that projects the image of the remote scene onto a screen E, facing a local participant PL. The screen E can be a plasma, LCD, CRT, etc. display. The image can have any format (16/9, 4/3, 3/4,) cinema standard, photograph, etc. The local participant PL observes the image of the remote scene formed on the screen E using a semi-reflective section 21 used, in this case, for its transmission capacity. A semi-reflective section is characterised by the reflection and transmission coefficients, for example, 30% and 70%, respectively.

Attached to the image sensing device, for example, a camera C1, are two mirrors that fold the beams, for example, two mirrors 11 and 12 and the semi-reflective section 21 for folding the beams F. It can also include a lens O, for example a Fresnel lens, to reduce the optical path of the camera beams.

The semi-reflective section is used in this case for its reflective capacity and thus ensures the possible function of the mirror 10. Reference 100 corresponds to a virtual camera in this case, but that corresponds as such if the beam is not folded.

This independent image sensing device allows creating the telepresence effect (reduction of the lack of eye contact effect, non-overlapping of images, panoramic effect) and is connected to a recovery system that has a kiosk effect that is closer so that there is juxtaposition of the projected image on the screen as flat as possible (the kiosk is very open.) The screen can also be curved.

Figure 11:
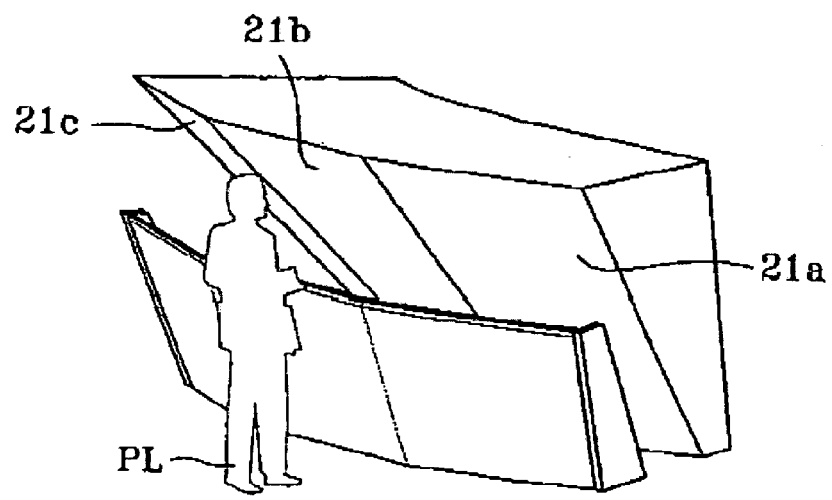
FIG. 11 represents a view of an embodiment in polygonal kiosk form of an interactive audio-visual system.

FIG. 11 schematically represents, in perspective, an audio-visual interactive system according to the invention that includes several modules similar to the one indicated in FIG. 10 and placed on a polygonal kiosk. It can be in the form of a circle arch if the screens are curved.

This system includes several semi-reflective sections 21a, 21b (hidden,) 21c (hidden,) and several mirrors 11a (hidden,) 11b, and 11c.

For the sound, an example of embodiment is placing one or several microphones on top of or below the semi-reflective section 21 in order to capture the sound of a person located in front of the module, placing one or several speakers on top of or below the reflective section 21 in order to recover the sound.

It is understood that no audio peripherals must disrupt the optical paths of the cameras, video projectors, the eyes of the people using the system, etc. Moreover, it is necessary that these audio peripherals be placed as close to the users as possible to allow correct sound capture and recovery.

What is claimed is:

1. Audio-visual system to bring together a local scene and a remote scene, the audio-visual system comprising:
    several concatenated audio-visual modules, each module containing a variable field image sensing device and a sound pickup device of the local scene, and an image and sound recovery device of the remote scene in an image plane, the modules being connected to a transmission network; and
    feedback control and control means for feedback controlling the variable field image sensing devices of the various modules so as to automatically eliminate overlap areas and ensure image and sound quality continuity on the image plane when people being filmed or recorded pass in front of the various image and sound pickup devices of the scene concerned.

2. Audio-visual system according to claim 1, wherein the feedback control means include feedback control means of image recovery devices that receive reference signals to feedback control the image and sound recovery devices with respect to these reference signals.

3. Audio-visual system according to claim 2, wherein the reference signals are provided by an external device or by one of the modules.

4. Audio-visual system according to claim 2, wherein the reference signals are external and are provided by the sound pickup device.

5. Audio-visual system according to claim 1, wherein the feedback control means are performed by processing units that include a programmed programme memory for activating the required feedback control means.

6. Audio-visual system according to claim 1, wherein the feedback control and control means control the transmission on the network over a data flow, separated for each module.

7. Audio-visual system according to claim 1, wherein the feedback control and control means control the multiplexed transmission over a single network channel for all the modules.

8. Audio-visual system according to claim 1, wherein the image and sound recovery device includes at least a screen on which the remote scene image is formed and a semi-transparent mirror that can form on the image plane, the screen image, said semi-transparent mirror being placed between a mirror of the image sensing device connected to this module and the local scene so that rays cross said semi-transparent mirror and reach the mirror of the image sensing device.

9. System according to claim 8, wherein the semi-transparent mirror is flat or concave.

10. System according to claim 9, wherein the semi-transparent mirror is concave, said mirror presents a focus, and said system further includes a projector located near the focus of said mirror.

11. System according to claim 8, wherein the semi-transparent mirror is a cylindrical or toric shape or a revolution mirror.

12. System according to claim 8, wherein the image sensing devices and/or the recovery devices are aligned.

13. System according to claim 8, wherein the image sensing devices and/or the recovery devices are placed according to a convex curve.

14. System according to claim 8, further including a lens to reduce the optical path of the camera beam.

15. Audio-visual system to bring together a local scene and a remote scene, the audio-visual system comprising:
    several concatenated audio-visual modules, each module containing an image sensing device and a sound pickup device of the local scene, and an image and sound recovery device of the remote scene in an image plane, the modules being connected to a transmission network; and
    feedback control and control means between the various modules to ensure image and sound quality continuity on the image plane when people being filmed or recorded pass in front of the various image and sound pickup devices of the scene concerned,
    wherein the modules include presence detectors for detecting the presence of an adjacent module, the presence detectors being connected to the feedback control and control means.

16. Audio-visual system according to claim 15, wherein the presence detectors are comprised of presence sensors.

17. Audio-visual system according to claim 2, wherein the presence detectors are comprised of sound reception means and detect modification of this reception.

18. Audio-visual system to bring together a local scene and a remote scene, the audio-visual system comprising:
    several concatenated audio-visual modules, each module containing an image sensing device and a sound pickup device of the local scene, and an image and sound recovery device of the remote scene in an image plane, the modules being connected to a transmission network; and
    feedback control and control means between the various modules to ensure image and sound quality continuity on the image plane when people being filmed or recorded pass in front of the various image and sound pickup devices of the scene concerned,
    wherein the feedback control and control means include feedback control means of the image sensing devices that receive the reference signals to feedback control the image sensing devices with respect to these reference signals.

19. Audio-visual system to bring together a local scene and a remote scene, the audio-visual system comprising:
    several concatenated audio-visual modules, each module containing an image sensing device and a sound pickup device of the local scene, and an image and sound recovery device of the remote scene in an image plane, the modules being connected to a transmission network; and
    feedback control and control means between the various modules to ensure image and sound quality continuity on the image plane when people being filmed or recorded pass in front of the various image and sound pickup devices of the scene concerned,
    wherein the feedback control and control means include feedback control means of the sound pickup and sound recovery devices that receive reference signals for feedback control of the sound pickup and sound recovery devices with respect to these reference signals.

20. Audio-visual system according to claim 19, wherein the reference is external and is provided by the image sensing device.

21. Audio-visual system according to claim 19, wherein the reference signals are provided by each module or by the adjacent module(s).

* * * * *